US012681777B2

(12) United States Patent
Potteiger et al.

(10) Patent No.: US 12,681,777 B2
(45) Date of Patent: Jul. 14, 2026

(54) SOFTWARE DEFINED RANDOMIZATION FOR THE MITIGATION OF UNKNOWN VULNERABILITIES

(71) Applicant: Arms Cyber Defense, Inc., Franklin, TN (US)

(72) Inventors: Bradley David Potteiger, Baltimore, MD (US); Timothy Ryan Potteiger, Pasadena, MD (US); Michael Charles Bryant, Brentwood, TN (US); William Spencer Betts, Nashville, TN (US)

(73) Assignee: Arms Cyber Defense, Inc., Brentwood, TN (US)

( * ) Notice: Subject to any disclaimer, the term of this patent is extended or adjusted under 35 U.S.C. 154(b) by 552 days.

(21) Appl. No.: 17/974,360

(22) Filed: Oct. 26, 2022

(65) Prior Publication Data

US 2023/0129259 A1     Apr. 27, 2023

Related U.S. Application Data

(60) Provisional application No. 63/272,138, filed on Oct. 26, 2021.

(51) Int. Cl.
*G06F 21/54*          (2013.01)
*G06F 9/52*           (2006.01)
          (Continued)

(52) U.S. Cl.
CPC .............. *G06F 9/526* (2013.01); *G06F 9/544* (2013.01); *G06F 21/121* (2013.01);
          (Continued)

(58) Field of Classification Search
CPC ........ G06F 9/526; G06F 9/544; G06F 21/554; G06F 21/552; G06F 21/53; G06F 21/566;
          (Continued)

(56) References Cited

U.S. PATENT DOCUMENTS 10,169,586 B2    1/2019  Maciejak et al.
10,193,918 B1    1/2019  Patton et al.
          (Continued)

OTHER PUBLICATIONS

Yue Chen et al., Remix: On-demand Live Randomization, Mar. 9-11, 2016, [Retrieved on Feb. 20, 2025]. Retrieved from the internet : <URL: https://dl.acm.org/doi/pdf/10.1145/2857705.2857726> 12 Pages (50-61) (Year: 2016).*
          (Continued)

*Primary Examiner* — Anibal Riveracruz
(74) *Attorney, Agent, or Firm* — Adams Intellex, PLC

(57)          ABSTRACT

Various embodiments of an apparatus, methods, systems and computer program products described herein are directed to detecting initiation of one or more shared libraries being loaded into a runtime memory of an application. While the one or more shared libraries are being loaded into the runtime memory, randomization code is placed into the runtime memory. For each respective shared library loaded into the runtime memory: randomization code allocates a new segment of runtime memory. The randomization code inserts a copy of the shared library into the new segment of runtime memory and overwrites a current segment of runtime memory at which the shared library is currently stored.

11 Claims, 6 Drawing Sheets

400

RECEIVE CUSTOMIZED INTERVAL PERIOD          410

DETECT LOADED OF SHARED LIBRARIES INTO RUNTIME MEMORYOF AN APPLICATION          420

INSERT RUNRAND INTO RUNTIME MEMORY          430

PRIOR TO APPLICATION EXECUTION: FOR EACH SHARED LIBRARY: ALLOCATE, INSERT, OVERWRITE          440

WHILE THE APPLICATION EXECUTES: DURING EACH INTERVAL INSTANCE: PAUSE APPLICATION, RANDOMIZE AND RESUME APPLICATION          450

(51) Int. Cl.

| | |
|---|---|
| *G06F 9/54* | (2006.01) |
| *G06F 21/53* | (2013.01) |
| *G06F 21/55* | (2013.01) |
| *G06F 21/56* | (2013.01) |
| *G06F 21/57* | (2013.01) |
| *G06F 21/12* | (2013.01) |

(52) U.S. Cl.
CPC ............ *G06F 21/125* (2013.01); *G06F 21/53* (2013.01); *G06F 21/54* (2013.01); *G06F 21/552* (2013.01); *G06F 21/554* (2013.01); *G06F 21/565* (2013.01); *G06F 21/566* (2013.01); *G06F 21/57* (2013.01); *G06F 21/577* (2013.01)

(58) Field of Classification Search
CPC ........ G06F 21/54; G06F 21/577; G06F 21/57; G06F 21/121; G06F 21/565; G06F 21/125
See application file for complete search history.

(56) References Cited

U.S. PATENT DOCUMENTS

| | | | |
|---|---|---|---|
| 10,509,905 B2 | 12/2019 | Gupta et al. | |
| 10,685,111 B2 | 6/2020 | Brown | |
| 10,956,569 B2 | 3/2021 | McGregor et al. | |
| 11,100,241 B2 | 8/2021 | Barak | |
| 11,645,383 B2 * | 5/2023 | Guri | G06F 21/54 |
| | | | 726/22 |
| 2013/0347111 A1 * | 12/2013 | Karta | H04L 63/1441 |
| | | | 726/23 |
| 2018/0046585 A1 * | 2/2018 | Okhravi | G06F 12/023 |
| 2019/0073481 A1 * | 3/2019 | Angelino | G06F 8/65 |
| 2020/0372129 A1 * | 11/2020 | Gupta | G06F 21/52 |
| 2022/0019657 A1 * | 1/2022 | Sethumadhavan | G06F 21/53 |

OTHER PUBLICATIONS

Martin Jauernig, Towards A Write Execute Architecture For JIT Interpreters, 2014, [Retrieved on Feb. 20, 2025]. Retrieved from the internet: < URL: https://web.archive.org/web/20210812015555id_/ https://repositum.tuwien.at/bitstream/20.500.12708/8366/2/ Jauernig> 73 Pages (1-73) (Year: 2014).*

Prabhu Rajasekaran et al., CoDaRR:Continuous Data Space Randomization against Data-Only Attacks, Oct. 5-9, 2020, [Retrieved on Feb. 20, 2026]. Retrieved from the internet: <URL: https://dl.acm.org/doi/pdf/10.1145/3320269.3384757> 13 Pages (494-505) (Year: 2020).*

* cited by examiner

400

RECEIVE CUSTOMIZED INTERVAL PERIOD — 410

DETECT LOADED OF SHARED LIBRARIES INTO RUNTIME MEMORYOF AN APPLICATION — 420

INSERT RunRand INTO RUNTIME MEMORY — 430

PRIOR TO APPLICATION EXECUTION: FOR EACH SHARED LIBRARY: ALLOCATE, INSERT, OVERWRITE — 440

WHILE THE APPLICATION EXECUTES: DURING EACH INTERVAL INSTANCE: PAUSE APPLICATION, RANDOMIZE AND RESUME APPLICATION — 450

SOFTWARE DEFINED RANDOMIZATION FOR THE MITIGATION OF UNKNOWN VULNERABILITIES

CROSS-REFERENCE TO RELATED APPLICATIONS

This application claims the benefit of U.S. Provisional Application No. 63/272,138 filed on Oct. 26, 2021, which is hereby incorporated by reference in its entirety.

SUMMARY

Software defined randomization enforces a zero trust software model. Software defined randomization does so through enforcing an authorization policy in which a program (e.g. software application) is the only user of itself. Typically, the assumption is made that a program will be the only user of itself. However, this assumption can be invalidated. In the instance of a return-oriented programming buffer overflow attack, it will be the case that an attacker entity (or source or application) will gain control of the program and become the user of the program. With software defined randomization, an attacker trying gaining control of the program, by calling functions within the program by their addresses, will be unable to do so when the functions addresses are continually rerandomized. This prevents the attacker from becoming a user of the program and enforces the policy of a program being the only user of itself.

Various embodiments of an apparatus, methods, systems and computer program products described herein are directed to detecting initiation of one or more shared libraries being loaded into a runtime memory of an application. While the one or more shared libraries are being loaded into the runtime memory, randomization code is placed into the runtime memory. For each respective shared library loaded into the runtime memory: randomization code allocates a new segment of runtime memory. The randomization code inserts a copy of the shared library into the new segment of runtime memory and overwrites a current segment of runtime memory at which the shared library is currently stored.

In some embodiments, an endpoint module at a client computer system receives randomization code ("RunRand" or "RunRand library") and a customized interval period. RunRand is placed into runtime memory of an application before it runs. RunRand thereby randomly allocates and assigns new runtime memory segments at which to store copies of shared libraries that have been loaded into runtime memory. While the application is running, RunRand can be repetitively executed according to the customized interval period. During each instance of the interval period, RunRand again assigns new runtime memory segments at which to store new copies of the shared libraries.

In some embodiments, an endpoint module is downloaded to a client computer system. The endpoint module detects when an application is being loaded into runtime memory in order to be executed. When the application is being loaded into runtime memory, the endpoint module injects the Run-Rand library into runtime memory as the other shared libraries of the application are also being loaded into runtime memory. RunRand allocates new runtime memory regions and copies the other shared libraries. RunRand then places the shared library copies in the newly allocated runtime memory regions. For example, RunRand may call a "Malloc" command to allocate new memory regions.

To copy a shared library over to a newly allocated runtime memory region, RunRand may access a struct header that contains data about the current segments of the shared library, such as a code segment(s) and a data segment(s)—which may be currently stored at discontinuous runtime memory regions. RunRand accesses the current runtime memory regions of a shared library's data and code segments and copies the data and code segments over to newly allocated runtime memory regions.

RunRand further updates function pointers in a shared library's copied data segment(s) to ensure the function pointers now point to the new runtime memory region(s) of the shared library's copied code segment(s). To do so, RunRand updates a procedural linkage table (PLT) that is also stored in the runtime memory. RunRand accesses the PLT and locates function pointers that point to the shared library's functions and updates the memory locations referenced by the function pointers. Once the shared library has been fully copied over and the PLT has been updated, RunRand overwrites the current original memory locations of the shared library.

In various embodiments, RunRand may further execute while the application is running. At set intervals, defined by a received customized internal period, RunRand may again allocate new runtime memory regions, insert copies of shared libraries into the new runtime memory regions, update the PLT and overwrite previous runtime memory regions. To do so, RunRand pauses the application in order to initiate and execute the allocate, insert, update and overwrite operations. To pause the application, RunRand, at a particular point in time [t(0)], waits for all current functions of the application in use as of t(0) to complete execution. Once all such functions are completed, RunRand sets a semaphore flag of each function of the shared libraries to represent that each function is currently in use. After setting all the semaphore flags to represent an "in use" state, RunRand initiates and executes the allocate, insert, update and overwrite operations. When RunRand has executed the allocate, insert, update and overwrite operations for each shared library, it sends a condition variable signal to all waiting condition variables of the application in order to resume the application.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
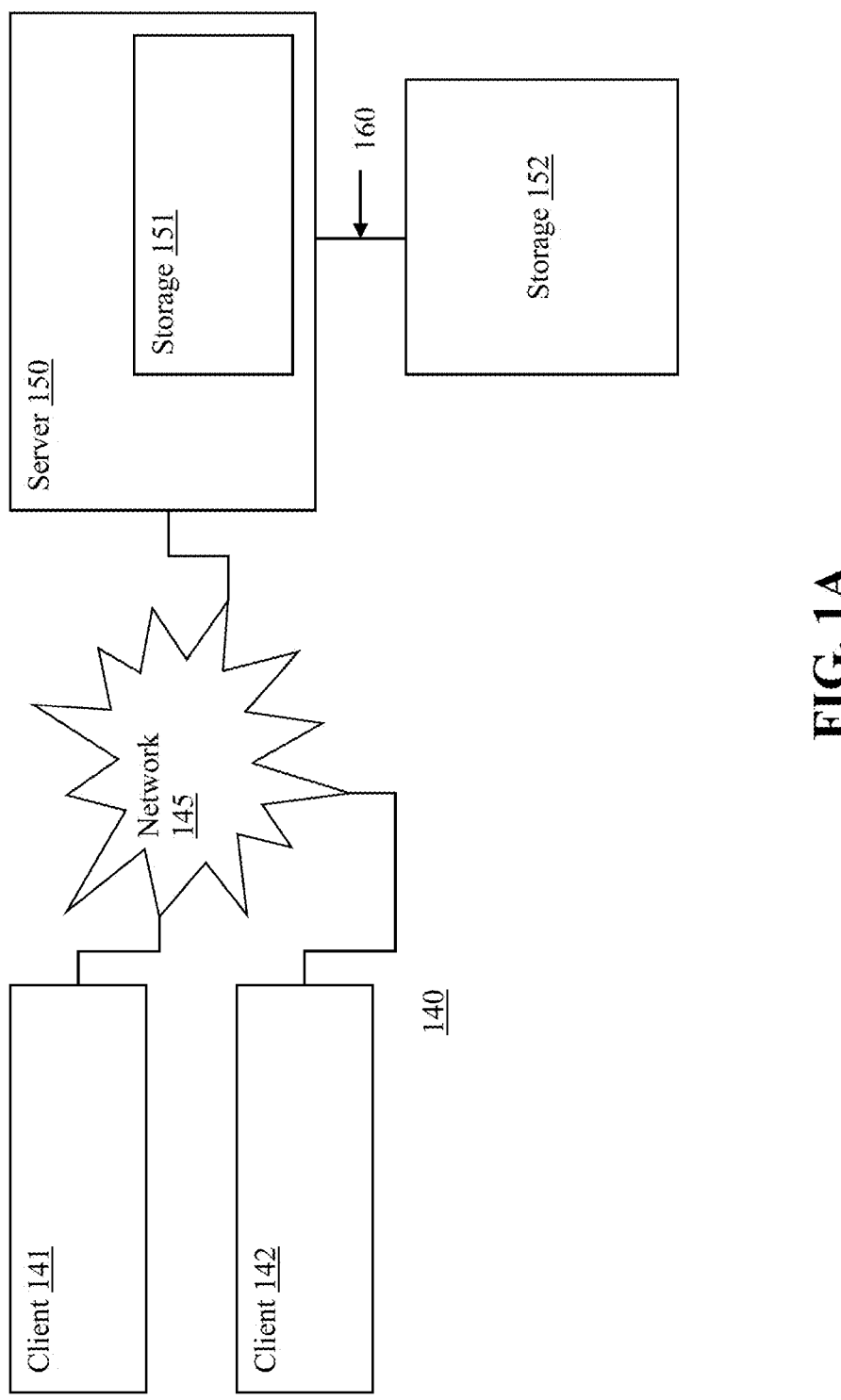
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
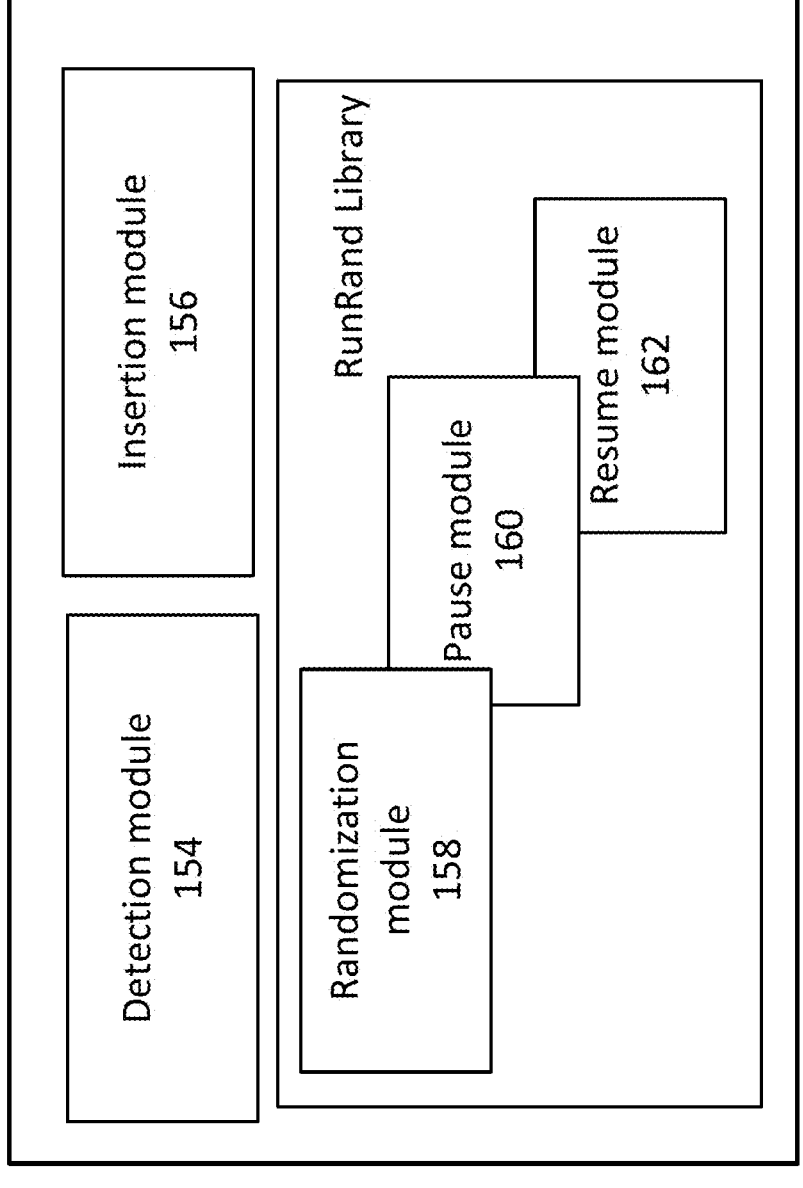
FIG. 1B is a diagram illustrating an exemplary environment in which some embodiments may operate.

FIG. 1B illustrates a block diagram of an example system 100 of various embodiments described herein that includes a detection module 154, an insertion module 156, a randomization module 158, a pause module 160 and a resume module 162. The system 100 may communicate with a user device 140 to display output, via a user interface 144 generated by an application engine 142.

The detection module 154 may perform functionality related to detecting shared libraries being loaded into runtime memory The insertion module 156 may perform functionality related to loading the RunRand library into the runtime memory The randomization module 158 may be part of the Run-Rand library that performs functionality related to allocating, copying, inserting and overwriting.

The pause module 160 may be part of the RunRand library that performs functionality related to pausing a currently running application.

The resume module 162 may be part of the RunRand library that performs functionality related to resuming a currently paused application.

It is understood that, in various embodiments, the detection module 154 and/or the insertion module 156 may also be part of the RunRand library as well.

The user interface module 116 of the system 100 may display information based on functionality as illustrated in FIGS. . . . .

While the databases 120, 122 and 124 are displayed separately, the databases and information maintained in a database may be combined together or further separated in a manner the promotes retrieval and storage efficiency and/or data security.

Figure 2:
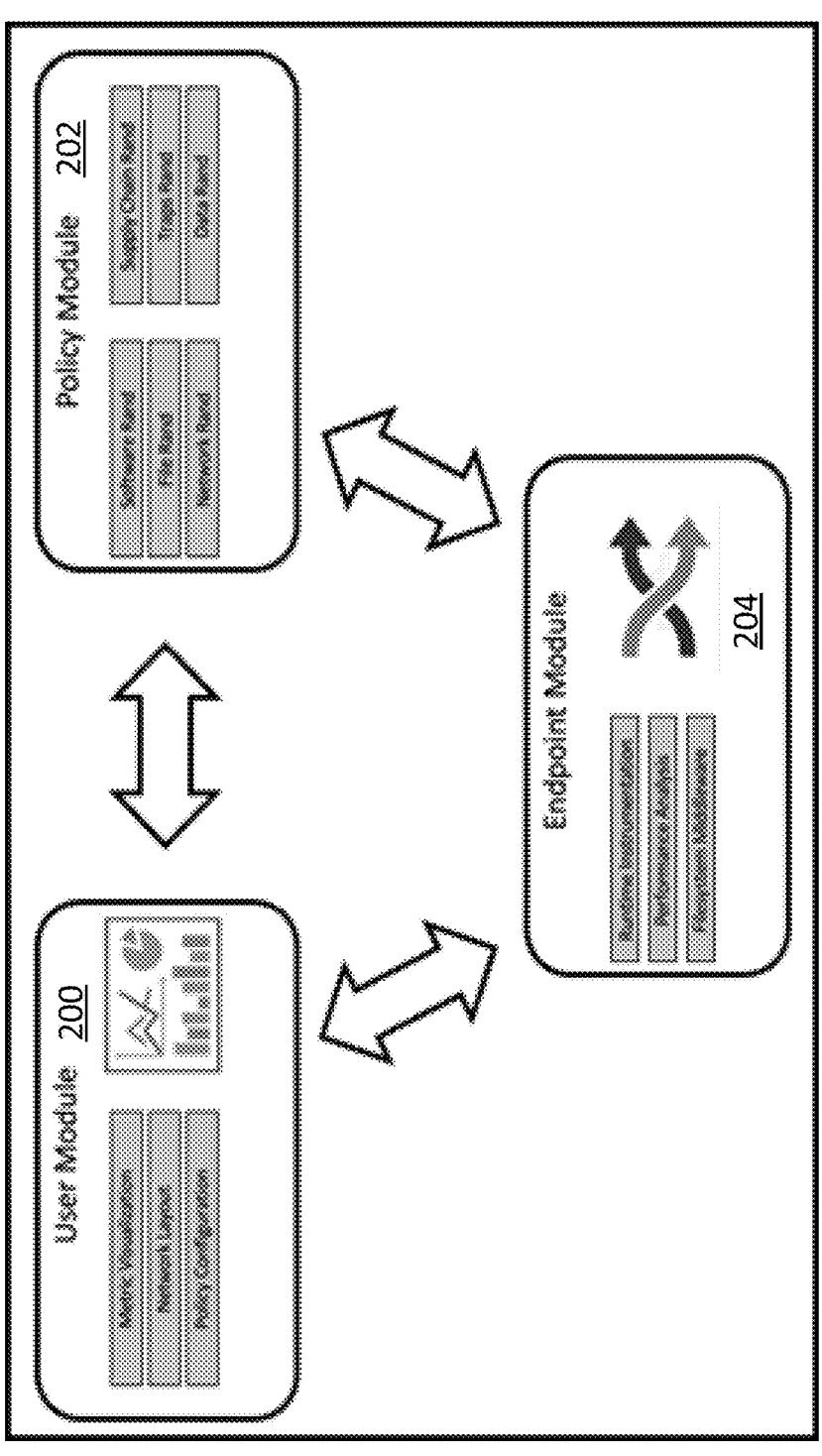
FIG. 2 is a diagram illustrating an exemplary environment in which some embodiments may operate.

As shown in FIG. 2, the architecture of various embodiments may be comprised of three modules: 1) User module 200, 2) Policy Module 202, and 3) Endpoint Module 204. In various embodiments, an endpoint may be a client computer system(s). The User module 200 includes software components and functionality for serving as the configuration engine and operational center for system administrators, allowing for the visualization of real time feedback and threat intelligence, connecting and visualizing endpoint connectivity and metrics, and the manual configuration of various security policies. From the user standpoint, this functionality will be made possible through a centralized web application dashboard. In various embodiments, a customized interval period may be defined and set at the User module.

The Policy module 202 includes software components and functionality for controlling the security policy instrumentation on the controlled endpoints, as well as ensuring the lack of disruption within key critical processes. It is important to note that there are various policy templates that can be launched, but the Policy module 202 is fully customizable allowing for users to create and integrate their own security controls. Various embodiments of the Policy module 202 may provide and configure one or more policies consisting of software randomization, File randomization (segmentation and randomized storage), network port and communication randomization, supply chain randomization for hardening third party libraries, trap randomization for detecting randomization, and data randomization for securing database information. One or all of these policies can be combined and launched together to form a truly defense in depth protective layer.

The Endpoint module 204 includes software components and functionality for controlling the runtime instrumentation and randomization strategies on the endpoint client. Furthermore, this module 204 serves as a relay to gather all relevant security and performance metrics to forward to the Policy and User modules 200, 202 for feedback. For example, Endpoint module 204 may be downloaded onto a client computer system and receives the RunRand library and the customized interval period from at least one of the Policy and User modules 200, 202. The RunRand library is further executed at the client computer system associated with the Endpoint module 204.

Figure 3:
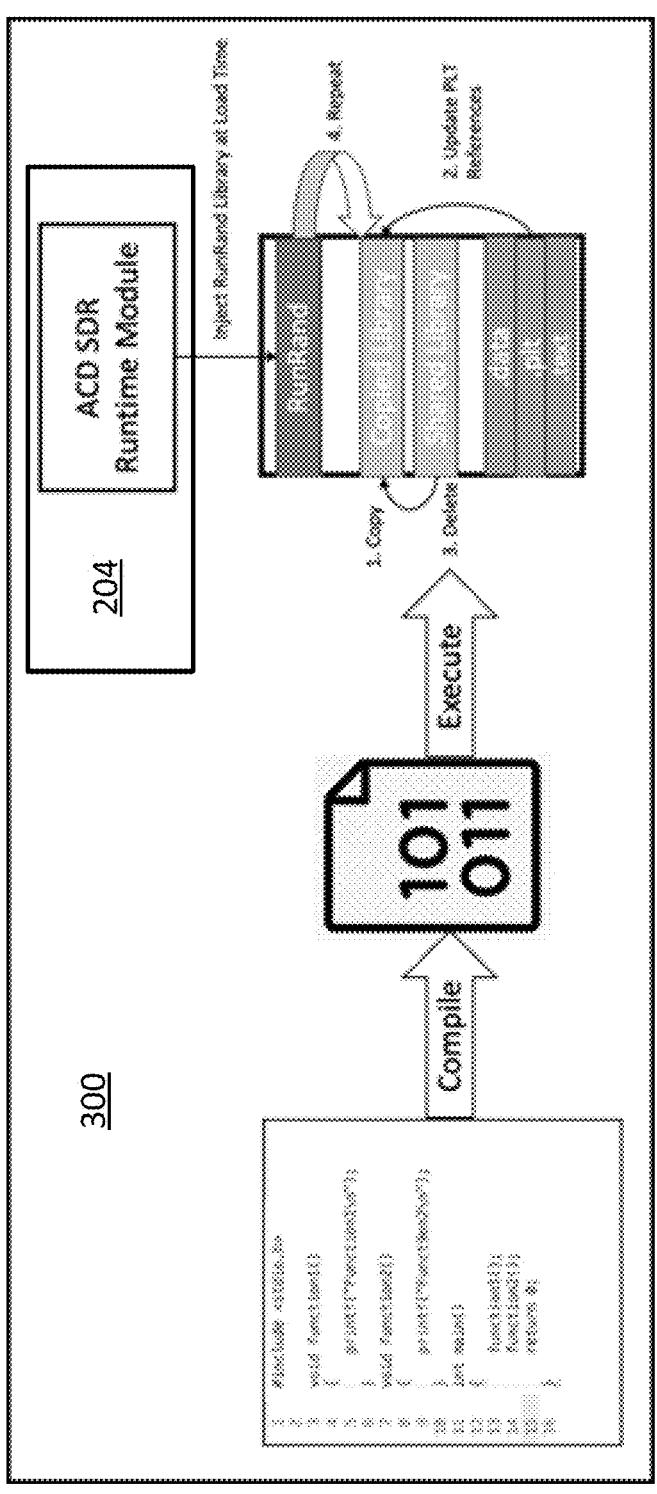
FIG. 3 is a diagram illustrating an exemplary environment in which some embodiments may operate.

As shown in FIG. 3, an endpoint client computer system 300 taps into the runtime execution of a critical process by injecting itself, via the Endpoint module 204, into every process during the course of an executable loading into memory. The endpoint client 300 will proactively inject a custom-built library ("RunRand") into the new program via the Endpoint module 204, allowing for the dynamic instrumentation at runtime. The RunRand library is injected in such a way as such that the library code will be executed before any code is executed from the main host program. The main task of the RunRand library is to relocate shared libraries and code segments throughout the host program at runtime. To accomplish this goal, the following four steps are followed: 1) the original library/code segment is copied from within the program and the respective memory is duplicated into a separate location in the running program memory, 2) all references to the old code base are updated through the PLT table, 3) the old code segment is deleted from program memory, and 4) the process is repeated for every respective code segment/library.

The existence of the injected RunRand library allows for the customization of software randomization schemes. This includes the frequency and magnitude of randomization including whether to perform transformations once at load time or periodically during runtime according to a customized interval period.

Figure 4:
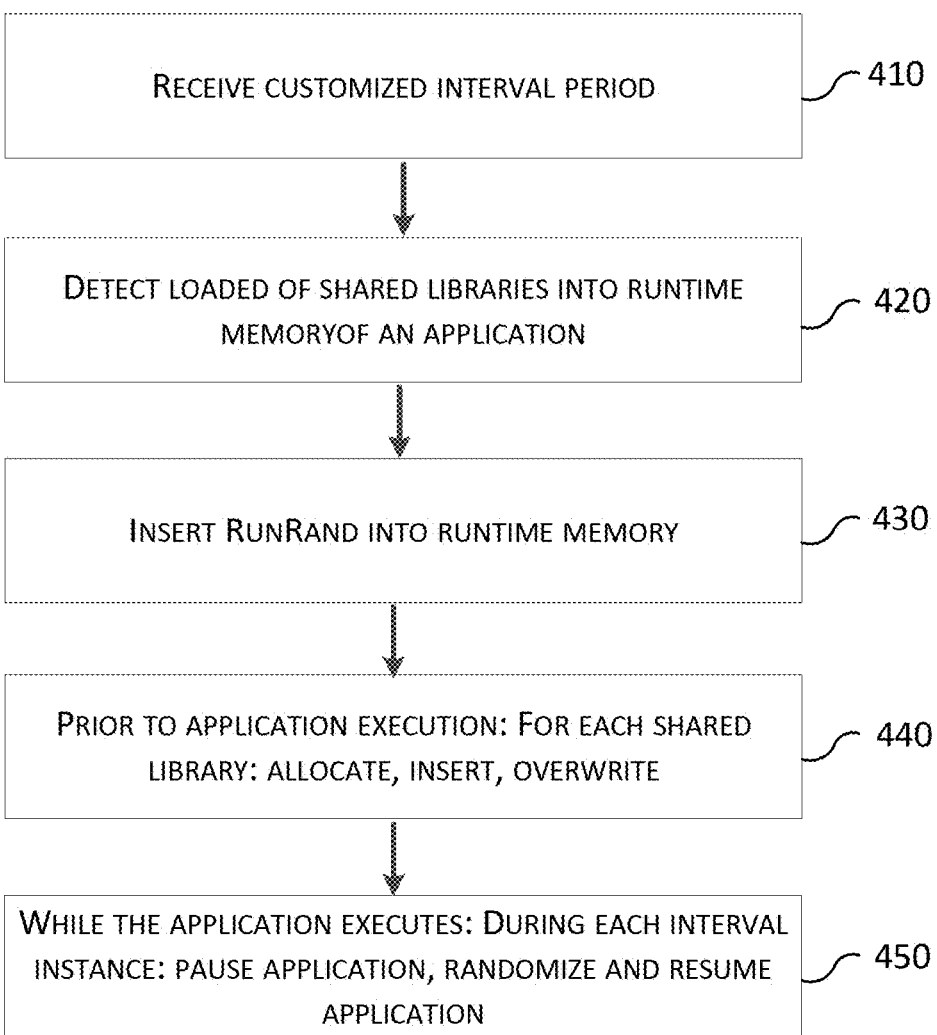
FIG. 4 is a diagram illustrating an exemplary method that may be performed in some embodiments.

As shown in the flowchart 400 of FIG. 4, various embodiments receive a customized interval period (Step 410) and detect initiation of one or more shared libraries being loaded into a runtime memory of an application (Step 420). While the one or more shared libraries are being loaded into the runtime memory, various embodiments place randomization code (e.g. RunRand) into the runtime memory (Step 430). Before the application is executed, RunRand is thereby executed to perform the following: for each respective shared library loaded into the runtime memory: (i) RunRand allocates a new segment of runtime memory, (ii) inserts a copy of the shared library into the new segment of runtime memory and (iii) overwrites a current segment of runtime memory at which the shared library is currently stored (Step 440).

RunRand may continue to execute while the application is running as well (Step 450). For example, RunRand may re-execute according to the customized internal period. For each instance of the customized interval period while the application is being executed, RunRand (i) pauses the application via the randomization code. While the application is paused, for each respective shared library of code, RunRand (ii) performs a new iteration of the allocating, inserting and overwriting via the randomization code (i.e. Step 440) and then sends a signal to resume the paused application (Step 450).

Figure 5:
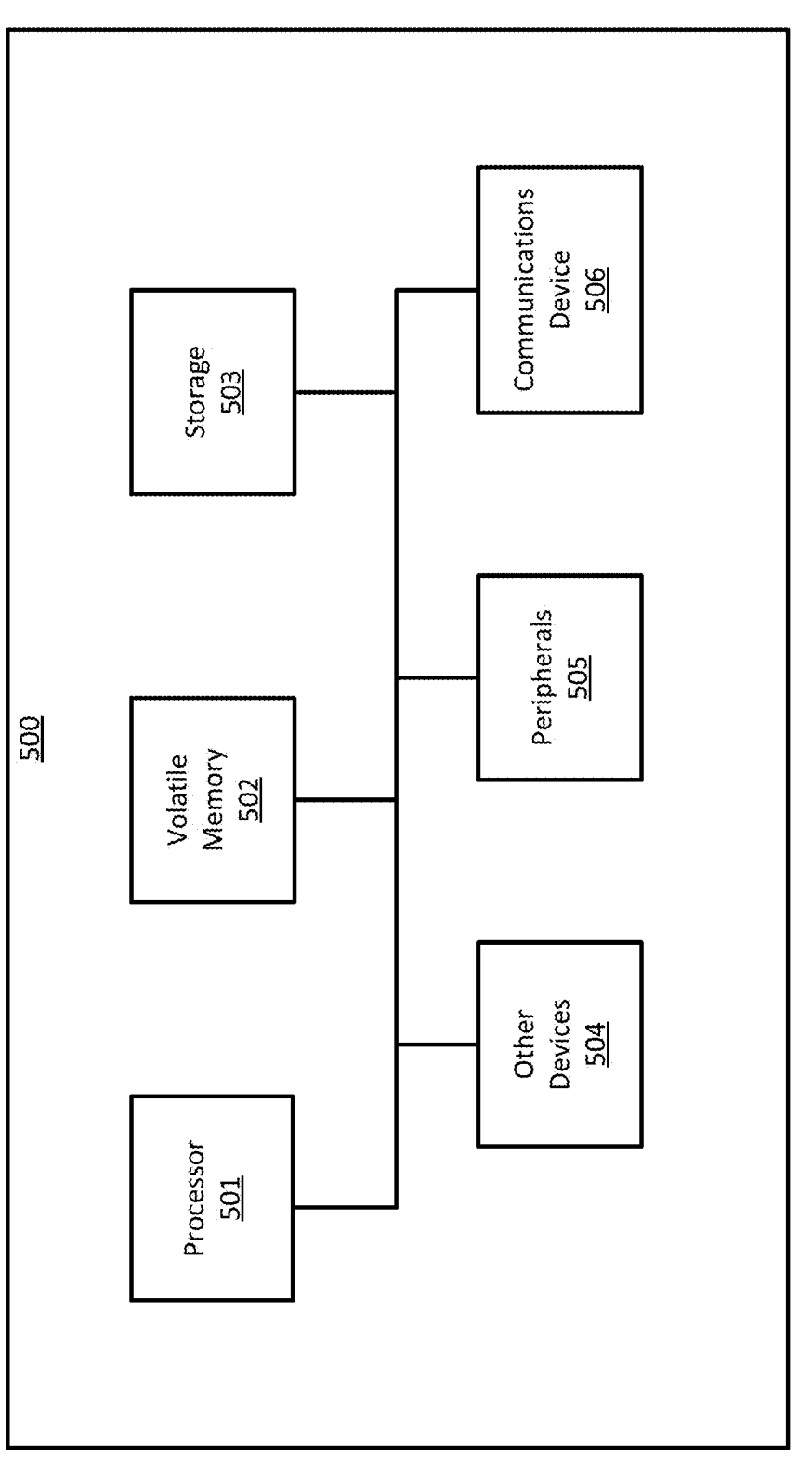
FIG. 5 is a diagram illustrating an exemplary environment in which some embodiments may operate.

FIG. 5 is a diagram illustrating an exemplary computer that may perform processing in some embodiments. As shown in the example of FIG. 5, an exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 500 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
detecting initiation of one or more shared libraries being loaded into a runtime memory of an application;
while the one or more shared libraries are being loaded into the runtime memory, placing, by an endpoint module, randomization code into the runtime memory;

for each respective shared library loaded into the runtime memory:
allocating, via the randomization code, a new segment of runtime memory;
inserting, via the randomization code, a copy of the shared library into the new segment of runtime memory; and
overwriting, via the randomization code, a current segment of runtime memory at which the shared memory is currently stored;
receiving, from a policy module, a customized interval period, wherein the policy module is configured to support one or more policy templates; and
for each instance of the customized interval period while the application is being executed:
pausing the application via the randomization code;
for each respective shared library of code, performing a new iteration of the allocating, inserting and overwriting via the randomization code while the application is paused; and
sending a signal, via the randomization code, to resume the application.

2. The computer-implemented method of claim 1, wherein receiving the customized interval period comprises:
receiving the customized interval period from a remote source, wherein customization of the interval period occurred at the remote source.

3. The computer-implemented method of claim 1, wherein pausing the application comprises:
setting, via the randomization code, all semaphore function flags of the application to in use flags; and
wherein sending the signal to resume the application comprises:
sending a condition variable signal to waiting condition variables associated with the semaphore function flags.

4. The computer-implemented method of claim 1, wherein allocating the new segment of runtime memory comprises:
allocating a first new segment of runtime memory for data of the shared library and a second new segment of runtime memory for code of the shared library, wherein the code and data of the shared library are currently stored at discontinuous segments of runtime memory.

5. The computer-implemented method of claim 4, wherein inserting the copy of the shared library of code into the new segment of runtime memory comprises:
inserting a copy of the code of the shared library into the first new segment of runtime memory; and
inserting a copy of the data of the shared library into the second new segment of runtime memory.

6. The computer-implemented method of claim 4, further comprising:
identifying, via the randomization code, at least one function pointer in a procedural linkage table in the runtime memory, the identified function pointer associated with a function of the shared library; and
updating a memory location referenced by the identified function pointer in the procedural linkage table, the updated memory location representing a memory location of the function in the first new segment of runtime memory that stores the copy of the code of the shared library.

7. The computer-implemented method of claim 1, further comprising enabling manual configuration of one or more security policies via the policy module, wherein the one or more security policies includes setting of the customized interval period.

8. The computer-implemented method of claim 1, further comprising displaying, via the policy module, a visualization of endpoint connectivity and performance metrics received from the endpoint module.

9. The method of claim 1, wherein the endpoint module is configured to control runtime instrumentation and randomization strategies on an endpoint client computer system, and further serves as a relay to gather security and performance metrics, and wherein the endpoint module proactively injects a custom-built library into a new program such that code from the custom-built library is executed before any code is executed from a host program of the application.

10. A system comprising one or more processors, and a non-transitory computer-readable medium including one or more sequences of instructions that, when executed by the one or more processors, cause the system to perform operations comprising:

receiving, from a policy module, a customized interval period, wherein the policy module is configured to support one or more policy templates;

detecting initiation of one or more shared libraries being loaded into a runtime memory of an application;

while the one or more shared libraries are being loaded into the runtime memory, placing, by an endpoint module, randomization code into the runtime memory;

for each respective shared library loaded into the runtime memory:

(i) allocating, via the randomization code, a new segment of runtime memory;

(ii) inserting, via the randomization code, a copy of the shared library into the new segment of runtime memory; and (iii) overwriting, via the randomization code, a current segment of runtime memory at which the shared library is currently stored; and for each instance of the customized interval period while the application is being executed:

(i) pausing the application via the randomization code;

(ii) for each respective shared library of code, performing a new iteration of the allocating, inserting and overwriting via the randomization code while the application is paused; and (iii) sending a signal, via the randomization code, to resume the application.

11. A computer program product comprising a non-transitory computer-readable medium having a computer readable program code embodied therein to be executed by one or more processors, the program code including instructions to:

receiving, from a policy module, a customized interval period, wherein the policy module is configured to support one or more policy templates;

detect initiation of one or more shared libraries being loaded into a runtime memory of an application;

while the one or more shared libraries are being loaded into the runtime memory, place, by an endpoint module, randomization code into the runtime memory;

for each respective shared library loaded into the runtime memory:

(i) allocate via the randomization code, a new segment of runtime memory;

(ii) insert, via the randomization code, a copy of the shared library into the new segment of runtime memory; and (iii) overwrite, via the randomization code, a current segment of runtime memory at which the shared library is currently stored; and for each instance of the customized interval period while the application is being executed:

(i) pause the application via the randomization code;

(ii) for each respective shared library of code, perform a new iteration of the allocating, inserting and overwriting via the randomization code while the application is paused; and (ii) send a signal, via the randomization code, to resume the application.

* * * * *